United States Patent [19]
Sciaky

[11] 3,746,831
[45] July 17, 1973

[54] METHOD FOR ELECTRON BEAM WELDING AT HIGH SPEEDS

[75] Inventor: David Sciaky, Chicago, Ill.

[73] Assignee: Welding Research, Inc., Chicago, Ill.

[22] Filed: Mar. 29, 1971

[21] Appl. No.: 129,000

[52] U.S. Cl. .......................... 219/121 EM
[51] Int. Cl. ............................. B23k 15/00
[58] Field of Search .............. 219/121 R, 121 EB, 219/121 FM; 250/49.5 R, 49.5 TE

[56] References Cited
UNITED STATES PATENTS

| | | | |
|---|---|---|---|
| 3,543,134 | 11/1970 | Aldenhoff | 219/121 EB X |
| 3,378,670 | 4/1968 | Smith et al. | 219/121 EM |
| 3,432,335 | 3/1969 | Schillen et al. | 219/121 EM X |
| 3,230,339 | 1/1966 | Opitz et al. | 219/121 EM |

*Primary Examiner*—J. V. Truhe
*Assistant Examiner*—Gale R. Peterson
*Attorney*—Julius L. Solomon

[57] ABSTRACT

The invention concerns a process of welding by an electron beam. The process is one of electron beam welding in which an electron beam is oscillated locally in a direction along a desired path on the work so as to determine a zone over which the beam is swept upon the work pieces which zone has a trailing edge at one end directed in the direction of the relative displacement of the parts with respect to the gun and a leading edge at its other end directed in the opposite direction to the relative displacement and where the power density of the beam is made to vary in a desired manner. For example, it may be reduced when it is abreast of the trailing edge of the swept zone with respect to the power density when the beam is abreast of the loading edge of the swept zone.

9 Claims, 21 Drawing Figures

Patented July 17, 1973            3,746,831

INVENTOR.
DAVID SCIAKY
BY Julius L. Solomon

*INVENTOR.*
DAVID SCIAKY

Patented July 17, 1973 3,746,831

INVENTOR.
DAVID SCIAKY
BY Julius L. Solomon

METHOD FOR ELECTRON BEAM WELDING AT HIGH SPEEDS

This invention concerns a process and apparatus for welding at high speed by means of a high power density beam of electrons which are generated, accelerated and focused by an electron gun.

The use of a high power density beam permits welding at very high speeds but one observes, however, that when one attains a certain welding speed with a corresponding power density, there is produced a back flow of molten metal away from the area where the beam is striking the work pieces which results in a line of weld which is not well filled and in which one can observe the presence of cavities. For example, when seam welding 0.896 inch thick ferritic stainless steel it is found that a good weld may be produced only below a welding speed of 190 inch/min. when the current in the beam is 300 MA at a voltage of 55 kilovolts and the round beam focused so that its waist is the plane of the surface of the material. As the speed is increased above 190 inch/min. globules first appear on the upper surface of the weld bead and as the speed is increased further the globules combine to form a ridge along the top bead and the under side of the bead is sucked back forming a groove below the welded zone.

In order to avoid these defects, one has been obliged to reduce the welding speed. Being hampered by this inconvenience one can then suppose that one could weld at great speeds utilizing a beam of electrons of a particular hetrogeneous nature which has different power densities at different points taken at the interior of the beam of electrons. Thus following this process one can, for example, give a beam of electrons a higher power density in the zone at the leading edge of the beam than in the zone at the trailing edge of the beam.

However, to put into practice this process, it will be necessary to develop and produce special electron beam guns since guns of this type are not currently being made. Furthermore, the application of a gun with this type of beam would be tricky and delicate, lacking in flexibility and its cost of manufacture would be very high. Even if a gun of this type were available the use of such a beam is very difficult for the following reason.

A beam of electrons used for welding must be focused to accommodate changes in the distance from the gun to the work pieces and the current required by the focus coil to focus the beam depends also upon the accelerating potential. When the focus coil current is varied, however, the beam of electrons is rotated about the longitudinal axes of the path of the electron beam. When the beam is round and has axial symmetry a change of focus will cause no appreciable change in symmetry or variation in the welding characteristics of the beam. However, should the beam be of non-uniform current density, for example, should its cross-sectional area be pear shaped, a change in focus would change the orientation of the beam with respect to the seam which is to be welded. The beam mentioned above which has a high power density at its leading edge and a low power density zone at its trailing edge under one condition of gun-to-work distance and accelerating voltage might be so rotated when the focus coil current is changed to accommodate a change in distance for the beam throw or a change in accelerating voltage, that its leading edge would have a low power density zone while its trailing edge a high power density zone, exactly the reverse of what is desired. In order to correct for this the electron gun would have to be rotated in order to properly orient the beam upon the seam. This, of course, is very impractical. The present invention aims at remedying these inconveniences and is related to a method which permits the production of welds at very high speeds with very high power densities without the risk of procuding defects within the welded zone or deformation of the parts which are welded on the line of their adjoinment.

In practicing the old method of E. B. welding one finds that the build up of a bead on the upper surface and the presence of a groove on the lower side is due to the fact that when welding with a high power density a hole is formed because of the rapid melting and slight evaporation of the material in the path of the beam. This molten material is thrown back in the wake of the weld and becomes chilled and solidified at a fast rate before it can all flow back and refill the hole that was formed. The present invention, by delaying the cooling rate of the molten material due to the post heating effect which is produced at the trailing edge zone of the oscillating path of the beam, allows the molten material to refill the holes produced by the high power density beam and thus to produce a complete and sound weld across the full thickness of the sheets being welded which is free from blow holes, porosities, chill cracks and other defects which result from too rapid a cooling in the welding zone. By the use of the method of the present invention sound welds have been made in thick materials at speeds from 350 inch to 500 inch/min.

Moreover the method of the invention permits one to realize the above results in a simple manner, at the same time, obtain a great flexibility of regulation.

The present invention concerns, to this effect, a method of welding characterized in that one displaces a beam of electrons of round cross section that the desired weld line on the abutting or overlapped work pieces to be welded, one oscillates the electron beam in a to and fro motion along this line and produces thus a zone of scanning for the beam presenting a trailing edge at one end directed in the direction of relative displacement of the work pieces with respect to the gun and a leading edge at its other end directed in a direction opposite to the relative displacement of the work and one effects thus a variation in the power density of the beam in such a way t at it is greatly reduced at the trailing edge of the zone swept by the beam and is highest in power density at its leading edge.

The average velocity of each oscillation is made at least 10 times the velocity at which the work is moving with respect to the gun so as to produce effectively an energy distribution on the work over a predetermined length along the desired weld path which is carried along the work as it is moved with respect to the gun so that energy is being delivered to the newly molten material in order to delay its coalescence so that it may refill the hole by the action of the combined forces of gravity and surface tension.

If we consider an example of a weld made at a speed of 7,200 mm/min – 120 mm/sec. with a beam having a diameter of 1 mm, we would find when oscillating the beam at a frequency of 60 Hz that the beam would be displaced 1 mm in 1/120 sec. (the duration of one-half cycle) in one direction and return in the second half cycle. The average speed of the sweep in either direction would be 120 mm/sec. The effect of this is that during the sweep in the direction of the moving work the velocity of the beam on the work would average zero whereas during the sweep in the opposite direction the average velocity would be 240 mm/sec. with the result that there would be a pattern of intense heat points 1 mm apart on the work. The sweep in this case would be increased to obtain an average sweep velocity of at least 1,200 mm/sec. by utilizing a frequency of at least 600 Hz. This would result in each portion of the weld path being traversed at least 10 times.

The invention includes also electron beam welding apparatus for putting the process into practice.

The method and apparatus conforming to the invention is illustrated in a non-limiting manner on the attached figures in which.

The process conforming to the invention has the result of obtaining an effective variation of the power density acting on the pieces to be welded from a homogeneous beam of electrons. This variation of the power density which is, in fact, the energy of the beam acting on the pieces over the area swept by the beam per unit of time is obtained by oscillating the beam of electrons by a to and fro motion, along the seam, and varying one or more of the parameters which define this power density, such as the beam current, the accelerating voltage, the concentration of the beam, or the speed of displacement of the beam, during the sweep cycle.

Figure 1:
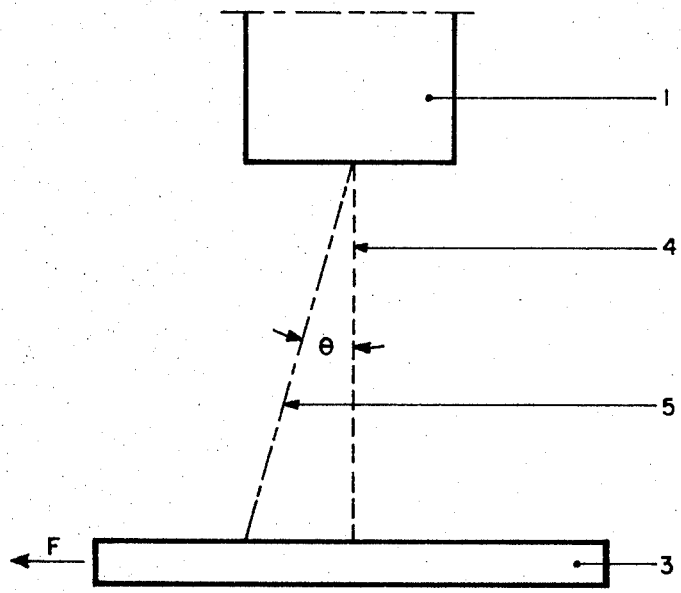
FIG. 1 represents schematically an electron beam welding machine.

Thus on FIG. 1 is represented a welding machine in which the electron gun 1 produces a beam of electrons directed towards the line of adjoinment of the work pieces 3. The pieces to be welded are displaced in the sense of the arrow "F" at a relative speed of displacement $v$ with respect to gun 1. In the actual realization, the gun 1 may be fixed and the work pieces 3 would move in the direction of the arrow "F."

The beam of electrons is displaced angularly along the line of weld between the extreme edges 4 and 5 which form the boundaries for the angle Theta.

Figure 2:
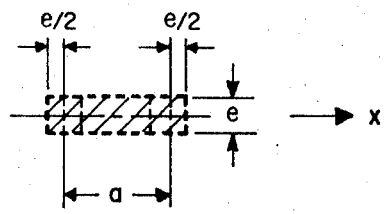
FIG. 2 represents the top view of the zone swept by the electron beam of the machine of FIG. 1.

The oscillation of the electron beam over the angle $\theta$(Theta) may be produced by well-known electronic apparatus and the value of $\theta$ will be determined as a function of the nature of the thickness of the pieces to be welded and as a function of the power density of the beam when it is at rest. FIG. 2 is a representation from above of the trace on the pieces to be welded of a beam of electrons having a square cross section with sides $e$. This beam, during the course of its angular displacement, marks out a swept zone, where the leading edge on the work pieces is constituted by the edge 4 of the beam directed in the sense opposite to the displacement of the work pieces 3, and in which the trailing edge 5 of the beam is directed in the sense of displacement of the work pieces 3.

Conforming to the invention the variation of power density of the beam during the course of the cyclic displacement of the beam of electrons is obtained upon making the instantaneous speed of displacement of the beam, its focus (concentration), its intensity (current), or the accelerating voltage vary during each period in such a way that the effective power density is at a maximum at the leading edge 4 of the swept zone and at a minimum value at the trailing edge 5.

Moreover, this variation of the power density from the leading edge to the trailing edge can be effected in a linear manner or in a non-linear manner depending upon the welding operation to be performed.

If one calls $p$ the power of the beam, which may be a function of $\theta$:

$e$ the width of a square shaped (for simplification) beam of uniform current density;

$V$ the speed of sweep for the beam which may also vary as a function of $\theta$;

$T$ the duration of the sweep;

the power density $\overline{P/S}$ is given by the following formula:

$$P/S = P/e\ (e+VT)$$

a value which is a function of $\theta$.

If the parameters of this formula are constant the product $VT$ is equal to $a$ (See FIG. 2) and the denominator is equal to the hatched surface of FIG. 2.

One may note, however, that for each point on the parts which is submitted to the action of the electron beam, the power density is not constant because one or more of the parameters is made to vary during each sweep of the beam. But it being given that the frequency of the sweep is much larger than the thermal inertia of the metal to be welded, one can calculate the mean power density at each point submitted to the oscillating beam of electrons.

In the example shown in FIGS. 3a to 3d and 6, the deflection of the beam is effected at a constant speed and the variation of the power density is obtained by varying the power of the gun. Thus on FIG. 3a one may see that the variation of the position of the beam corresponds to a saw tooth sweep, as well as that the speed of displacement $d\theta/dt$ of the beam of electrons is constant.

As a result in the above formula the product $VT$ is constant and the length of the swept zone is constant.

Figure 3A:
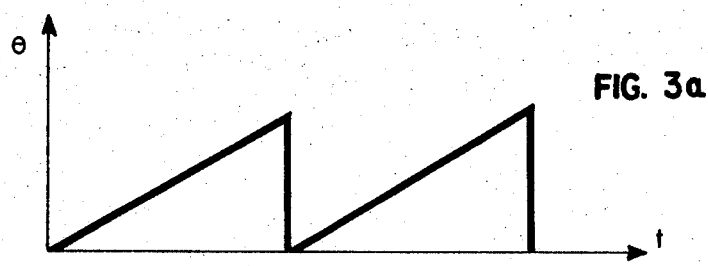
FIGS. 3a to 3d are graphical representations of examples of the practice of the method of the invention for the case where the power delivered to the work pieces by the electron gun is made to vary during each oscillation of the electron beam.
Figure 3B:
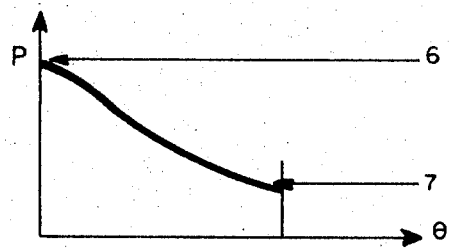
Figure 3C:
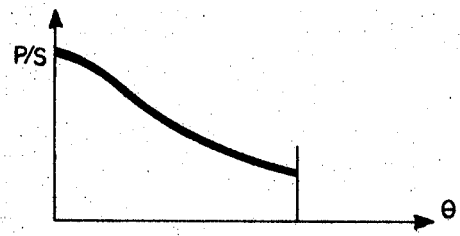
Figure 3D:
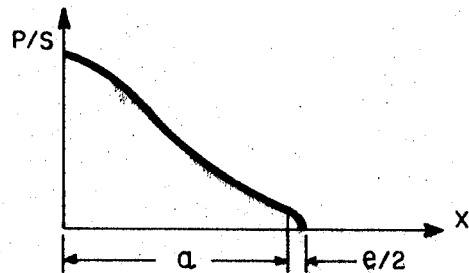

To obtain the desired result, one can then vary the power emitted by the gun in a manner indicated on the curve of FIG. 3b. The power density (FIG. 3c) therefore varies and follows a similar curve. Finally on the FIG. 3d has been represented the curve of the mean power density produced by the gun, during a time which is long with respect to the duration of each oscillation, over the area, swept during each sweep of the beam.

In this example the power of the gun varies in accordance with a law which is related to the angular deviation of the beam and in a manner such that the maximum power (Point 6 on the FIG. 3b) is produced where the beam is abreast of the leading edge 4 (FIG. 1) and in such a way that the minimum power (Point 7 FIG. 3b) is produced when the beam is abreast of the trailing edge 5 (FIG. 1) of the swept zone.

This variation in the power delivered by the gun can be obtained in various ways, for example, with a triode gun by acting upon the potential of the control electrodes so as to vary the beam current.

Figure 4A:
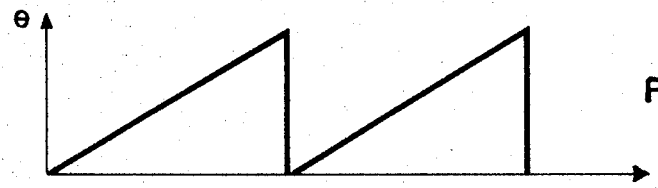
FIGS. 4a to 4d are graphs representing the practicing of the process of the invention for the case where the concentration of the electron beam is varied during the sweep of the beam.
Figure 4B:
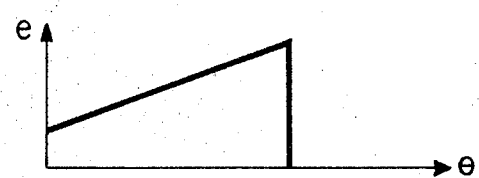
Figure 4C:
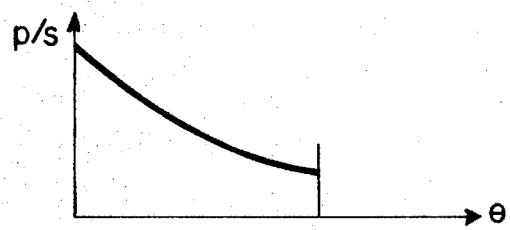
Figure 4D:
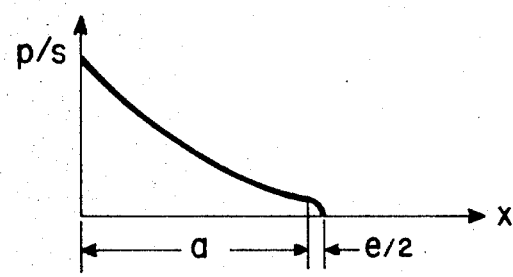

Conforming to the invention, this result can also be obtained by acting, not on the power of the beam, but on the concentration (focus) of the beam as a function of the deviation (FIG. 4b). In this case while maintaining a saw tooth sweep (FIG. 4a), one obtains equally a variation of the power density (FIGS. 4c and 4d) as a function of the deviation of the beam or as a function of the position of the beam on the pieces to be welded. (See respectively the FIGS. 4c and 4d).

A welding machine conforming to these examples is represented on FIGS. 6, 7, 8 and 9 in which the elements are represented by number as follows:
1. The electron gun.
3. The work pieces to be welded.
8. The carriage holding and transporting the work pieces.
9. The focusing coil.
10. The deflection coil.

Figure 8:
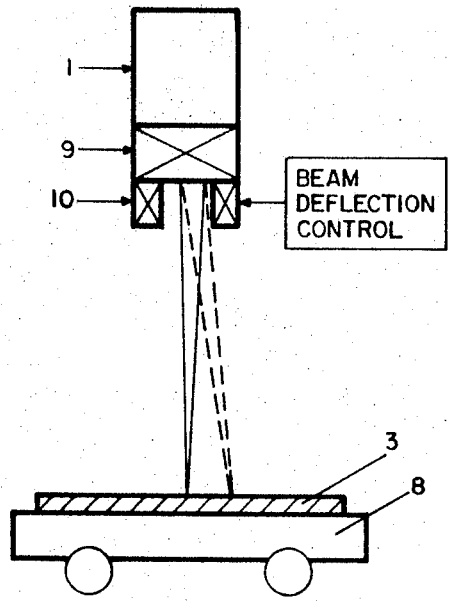
FIG. 8 is a schematic drawing showing the control functions of a welding machine in which one makes the velocity of the sweep of the beam vary during each oscillation of the beam following the examples shown in FIGS. 5a to 5g.
Figure 9:
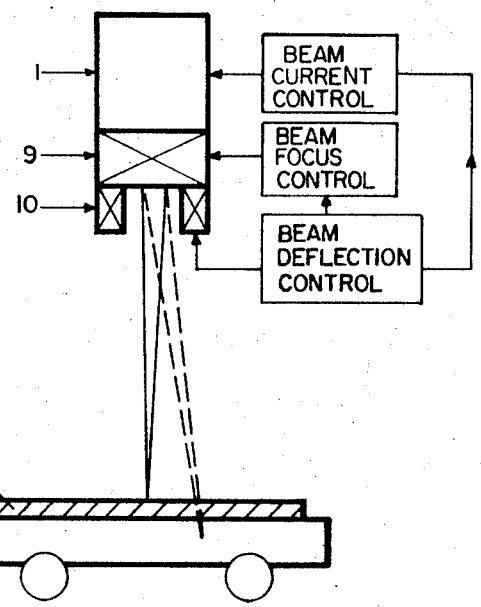
FIG. 9 is a schematic drawing showing the control functions of a welding machine in which the concentration of the beam, the deflection velocity, and the beam current of the gun may be varied singly or collectively during each oscillation.

In the practical example of FIG. 8, the functioning of which is illustrated by the FIGS. 5a to 5g, another mode of operation conforming to the invention is disclosed by which the gun power is maintained constant while the velocity of the sweep is varied in order to obtain the desired effect.

Figure 5A:
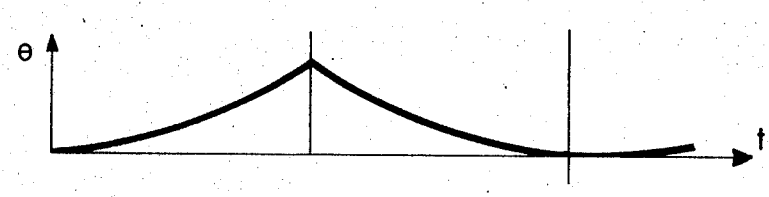
FIGS. 5a to 5g are graphs showing an example of the process of the invention for the case where the velocity at which the beam of electrons is swept is made to vary during each oscillation of the beam.
Figure 5B:
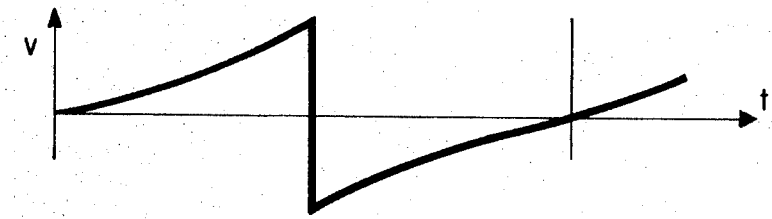
Figure 5C:
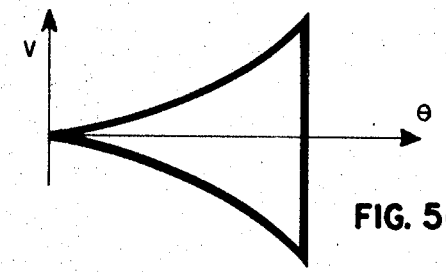
Figure 5D:
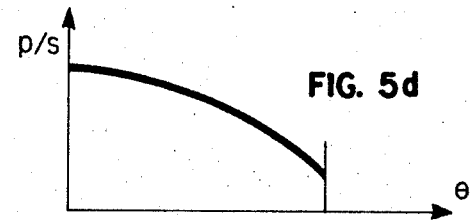
Figure 5E:
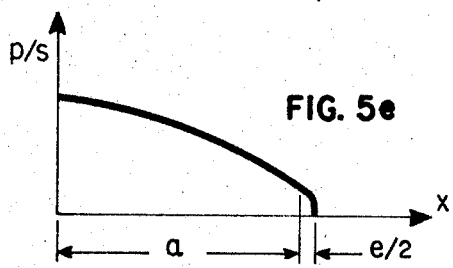

Thus FIG. 5a represents the curve of the angular deviation of the beam as a function of time, whereas FIG. 5b represents the speed of displacement of the beam on the work pieces as a function of time, and FIG. 5c represents the speed of displacement of the beam as a function of the deviation of the beam.

In this case an oscillating movement is communicated to the beam of electrons which has a law of displacement of parabolic shape. In this example one obtains, then, a variation of the power density as a function of the angular deviation, and as a function of the point of impact of the beam on the work pieces as is represented on FIGS. 5d and 5e.

It is possible to obtain any desired pattern of power density as a function of the point of impact of the beam by acting upon the parameters as above. In order to suit the characteristics of the wide variety of materials to be welded. For example, a pattern of low power density at the leading edge followed by high power density zone which is then followed by a zone of low power density at the trailing edge may readily be achieved.

Figure 5G:
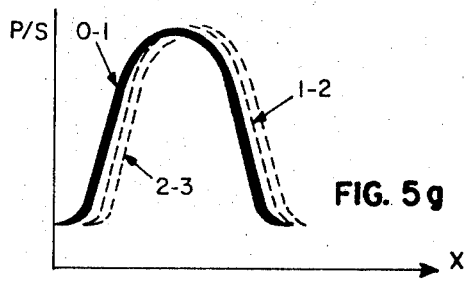
Figure 5F:
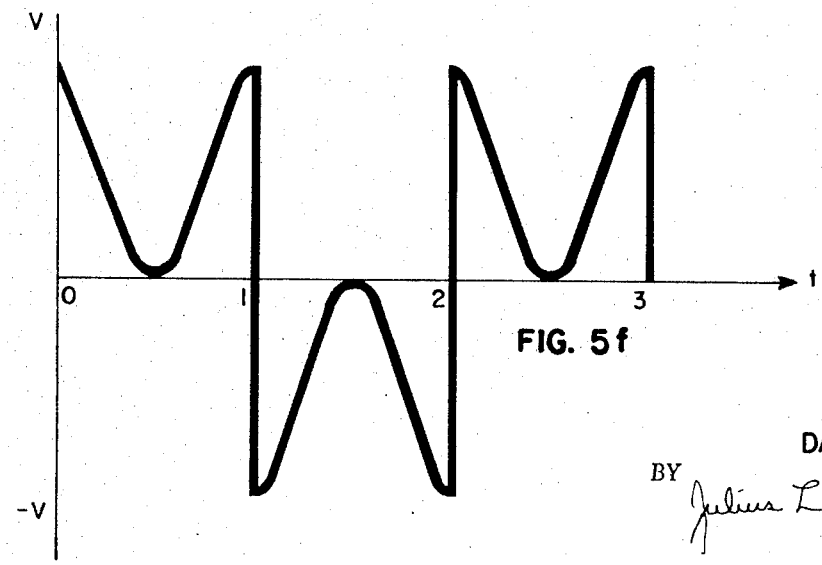

FIGS. 5f and 5g are graphical representations showing the effect of acting upon the sweep of the beam in such a way as to effect a preheat area ahead of the weld and a postheat area behind the weld as may be required in welding certain materials. FIG. 5f shows the instantaneous velocity of the oscillating beam and FIG. 5g shows the variation of power density of the beam along the path taken by the beam on the work. The curve from 0 – 1 on FIG. 5f illustrates the variation in velocity when the beam is moving in a direction opposite to the direction of motion of the work with respect to the electron gun. That portion between 1 and 2 shows the variation in velocity while the oscillating beam is returning in the same direction as the work is moving and the portion between 2 and 3 shows again the variation in velocity while the beam is moving in the direction opposite to the work movement.

FIG. 5g shows the resulting power density condition on the work over the path taken by the beam. The curve 0 – 1 describes the variation in power density during the time 0 – 1 when the beam is moving opposite to the direction of motion of the work the curve 1 – 2 shows the variation or power density when the beam is return-ing in the direction of the work motion and 2 – 3 shows the power density variation during the third sweep of the beam with respect to the distance along the work.

Figure 6:
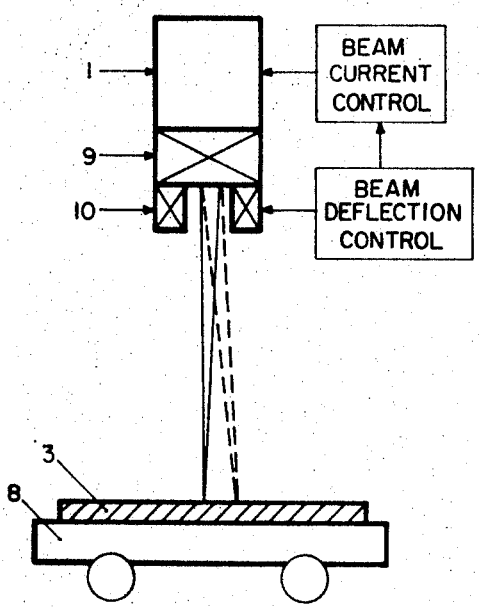
FIG. 6 is a schematic drawing showing the control elements of a welding machine in which the electron beam current delivered by the gun is made to vary with respect to time so as to result in an operation which corresponds to the examples of FIGS. 3a to 3d.
Figure 7:
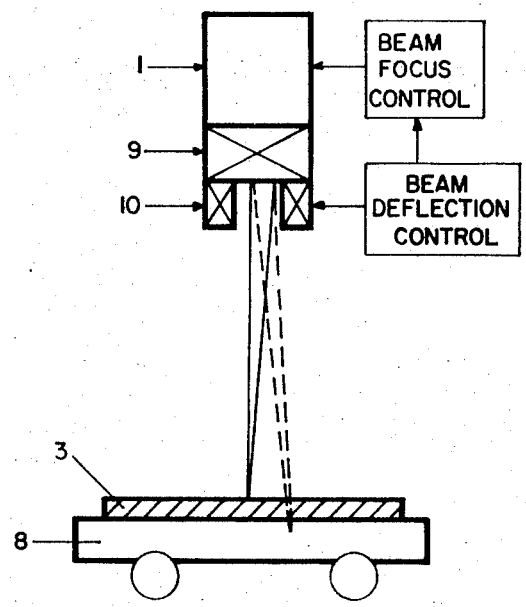
FIG. 7 is a schematic drawing showing the control elements, in block diagram form, of a welding machine in which the concentration of the beam varies to correspond to the graphs shown in FIGS. 4a to 4d.

In the examples of FIGS. 6, 7, and 8 has been shown schematically the means for varying the beam power, the beam concentration (focusing) and the speed of the sweep. It is well understood, however, that the combined variations of two or three of these parameters can be realized if necessary, by the apparatus which is represented on FIG. 9 in which the work pieces 3 are disposed on the mobile carriage 8 which is moved under the electron gun 1.

Along the axis of the gun are shown a focusing coil 9 and a deflection coil 10 and following the process chosen, one can act to vary the focus, to vary the speed of deflection, or to modify the intensity of the current of the gun or also to modify simultaneously several of these parameters.

It is well understood that the invention is not limited by the examples described and represented above by which one can foresee other modes and forms of realization without being removed from the scope of the invention.

What I claim is:

1. The process of welding workpieces along a given path by a beam of electrons, comprising the steps of generating, accelerating and focusing a beam of electrons by means of an electron gun, directing the said beam upon work to be welded, moving the said work relative to the said electron gun, oscillating the beam at a frequency higher than 600 Hz. over a distance corresponding essentially to a beam diameter along the said path and delivering to the work along the said path an energy per unit area which varies during each period of oscillation so as to produce the effect of a beam which has a leading edge at high energy density tapering down to a trailing edge at reduced energy density.

2. A method in accordance with Claim 1 including the step of varying the instantaneous velocity of the beam during each period of oscillation.

3. A method in accordance with Claim 1 including the step of oscillating the beam at such a frequency that the average velocity at which the beam is moving with respect to the work is at least one order of magnitude greater than the rate at which heat is conducted away from the point of impingement of the beam.

4. A method in accordance with Claim 1 including the step of oscillating the beam at such a frequency that the average velocity at which the beam is moving with respect to the work is at least one order of magnitude greater than the velocity of the work with respect to the gun.

5. A method in accordance with Claim 1 including the step of varying the electron beam current during each period of oscillation while maintaining all other beam parameters fixed.

6. A method in accordance with Claim 1 including the step of varying the acceleration potential of the said electron gun during each period of oscillation.

7. A method in accordance with Claim 1 including the step of varying the concentration of the electron beam during each period of oscillation.

8. A method in accordance with Claim 4 including the step of increasing the velocity of the beam from zero to some maximum value as it is swept in the same direction as the direction of travel of the work with respect to the gun and decreasing the velocity of the beam to zero as it travels in the opposite direction as the work.

9. A method in accordance with Claim 4 in which the velocity of the oscillating beam is decreased from a maximum to zero and back to a maximum while travelling in either direction with respect to the direction of travel of the work.

* * * * *